United States Patent [19]

Ueda et al.

[11] 4,038,172

[45] July 26, 1977

[54] METHOD FOR REMOVAL OF OXYGEN FROM OXYGEN-CONTAINING COMPOUNDS

[75] Inventors: Shigeru Ueda; Shinichi Yokoyama; Yoshinori Nakata; Yoshihisa Hasegawa; Yosuke Maekawa; Yuji Yoshida, all of Sapporo, Japan

[73] Assignee: Agency of Industrial Science & Technology, Tokyo, Japan

[21] Appl. No.: 621,134

[22] Filed: Oct. 9, 1975

[30] Foreign Application Priority Data

Oct. 16, 1974  Japan ................................ 49-119718

[51] Int. Cl.$^2$ .............................................. C10G 1/08
[52] U.S. Cl. ........................................ 208/10; 201/2.5
[58] Field of Search ...................... 208/10; 201/2.5, 25

[56] References Cited

U.S. PATENT DOCUMENTS

| | | | |
|---|---|---|---|
| 3,642,607 | 2/1972 | Seitzer | 208/10 |
| 3,687,838 | 8/1972 | Seitzer | 208/10 |
| 3,694,342 | 9/1972 | Sprow et al. | 208/10 |
| 3,733,255 | 5/1973 | Appell et al. | 201/2.5 |
| 3,796,650 | 3/1974 | Urban | 208/10 |
| 3,846,275 | 11/1974 | Urban | 208/10 |
| 3,920,536 | 11/1975 | Seitzer et al. | 208/10 |
| 3,926,775 | 12/1975 | Schroeder | 208/10 |
| 3,930,984 | 1/1976 | Pitchford | 208/10 |

OTHER PUBLICATIONS

Chemical & Engineering News, pp. 14 and 15, May 29, 1972.
Proceedings of the Second Mineral Waste Utilization Symposium, Mar. 18 & 19, 1970, pp. 304–307.
Van Nostrand's Scientific Encyclopedia 4th Ed., p. 1506, Van Nostrand Co. Inc., Princeton, N. J., 1968.
H. R. Appell et al., Chem. and Ind., Nov. 22, 1969, p. 1703.

Primary Examiner—Delbert E. Gantz
Assistant Examiner—James W. Hellwege
Attorney, Agent, or Firm—Kurt Kelman

[57] ABSTRACT

Removal of oxygen from an oxygen-containing compound and its conversion into an organic substance of a lower molecular weight is accomplished by causing the compound to react with water and carbon monoxide in the presence of a red clay catalyst.

1 Claim, No Drawings

METHOD FOR REMOVAL OF OXYGEN FROM OXYGEN-CONTAINING COMPOUNDS

BACKGROUND OF THE INVENTION

This invention relates to a method for removing oxygen from oxygen-containing compounds such as, for example, lignin, cellulose and coals such as bituminous coal, sub-bituminous coal, brown coal, lignite and grass peat and consequently producing from said compounds low molecular organic substances.

The high-pressure hydrogenation process which effects deoxidation by use of hydrogen has heretofore been available for removal of oxygen from oxygen-containing compounds. This technique is connected with liquefaction of coal.

In view of the present worldwide energy crisis, there is an acute need for inexpensive and effective techniques for the conversion of coals to a clean, liquid energy source, namely, for the production of man-made petroleum.

The high-pressure hydrogenation process for deoxidization by use of hydrogen is one of the techniques which have been developed to answer the need.

Coals have low hydrogen content as compared with liquid petroleum. Liquefaction of coals, therefore, is accomplished by hydrogenating coals at elevated temperatures under high pressure. At the same time, the oxygen contained in coals in amounts ranging from several percent to several tens of percent is caused to react with the hydrogen and is consequently removed in the form of water. This technique, thus, requires hydrogen for the removal of oxygen and for increasing the hydrogen content in the whole composition.

The production cost of hydrogen if fairly high at present. Brown coal, lignite, etc. occur abundantly throughout the world. They are inexpensive and generally possess high capacity for decomposition by hydrogenation. Notwithstanding such advantageous factors, they are not valued highly as the raw material for liquefaction of coal. This is because they have high oxygen content which can now be removed only through the consumption of a large amount of hydrogen, a factor which renders the operation economically infeasible.

An object of the present invention is to provide a method for easily removing oxygen from such oxygen-containing compounds as coals, lignin and cellulose which are natural resources available in immense abundance.

Another object of the present invention is to provide a method for producing low molecular compounds from coals, lignin, cellulose, etc.

SUMMARY OF THE INVENTION

To accomplish the objects described above, the present invention causes an oxygen-containing compound such as lignin, cellulose or any of the coals to be compressed with carbon monoxide and simultaneously heated in the presence of water and a red clay catalyst, whereby the water and carbon monoxide react upon the oxygen from said compound, with the result that the reaction removes oxygen from said compound and at the same time produces an organic compound having a low molecular weight from said compound

DETAILED DESCRIPTION OF THE INVENTION

The oxygen-containing compounds which are usuable for the present invention include coals such as bituminous coal, sub-bituminous coal, brown coal, lignite and grass peat, cellulosic substances such as wood and paper, lignin substances and petrolic asphalts.

The present invention accomplishes the removal of oxygen from said oxygen-containing compounds by using carbon monoxide and water available at a lower production cost than hydrogen and, at the same time, converts the compounds into organic compounds of lower molecular weights.

To effect the removal of oxygen in advantageous yields, the reaction conditions, namely the amount of water to be added to the compound, the reaction temperature, the pressure of carbon monoxide and the kind of catalyst, should to satisfy the following requirements.

The amount of water should be from 0.1 to 10 times the weight of the compound, the reaction temperature from 250° C to 500° C and the pressure of carbon monoxide from 1 to 300 atmospheres. The reaction fails to proceed smoothly when any of the values indicated above fails to reach the lower limit of the indicated range. The smooth proceeding of the reaction is not affected when the amount of water exceeds the upper limit of ten times. An increase in the amount of water, however, necessitates a proportional enlargement of the reaction equipment and adds to the difficulty encountered in the separation of the reaction product. From the commercial point of view, therefore, the amount of water should be limited to said 10 times. Although the pressure of carbon monoxide is desired to be as large as possible for the sake of the reaction, it is limited to 300 atmospheres from the engineering point of view. The upper limit of the reaction temperature if fixed at 500° C because, beyond 500° C, there is a possibility that the compound will undergo carbonization.

As the catalyst for the reaction, there is used red clay. The red clay is a red clayish substance which occurs in the manufacture of alumina from bauxite.

The composition of the red clay is not always fixed but is variable with the particular bauxite to be used. A typical red clay composition is 18 – 25% by weight $Al_2O_3$, 15 – 20% by weight of $SiO_2$, 30 – 40% by weight of $Fe_2O_3$, 2 – 8% by weight of $TiO_2$ and 8 – 12% by weight of ignition loss approximately.

Now the amount in which said red clay should be added to serve effectively as a catalyst will be described. The amount of red clay is from 1% to 10% by weight based on the compound. If the amount does not reach the lower limit of said range, the red clay fails to manifest its effect as a catalyst. If the amount exceeds the upper limit range, the catalytic effect manifested thereby does not proportionally increase but levels off. From the engineering point of view, therefore, it is appropriate that the amount be limited to the upper limit of said range.

The removal of oxygen from the oxygen-containing compound is believed to be attributable to the reactions which may be represented as follows by taking coal as a typical example.

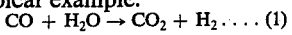

$$CO + H_2O \rightarrow CO_2 + H_2 \ldots (1)$$

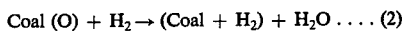

$$Coal\ (O) + H_2 \rightarrow (Coal + H_2) + H_2O \ldots (2)$$

Consequently, the oxygen in the coal is removed and at the same time hydrogen is incorporated into the coal. Thus, the reaction which converts the compound into the low molecular organic compound proceeds simultaneously with said reaction of deoxidization. The conversion affords a substance which has a lower oxygen content and a higher hydrogen content than the compound used as the starting material and exhibits solubility in organic solvents.

The method of the present invention has its effect enhanced when it is used in combination with a method which accomplishes liquefaction of coal, for example, by having the coal decomposed by means of compressed hydrogen gas.

As already described, the present invention simultaneously accomplishes the removal of oxygen from the compound and the conversion of the compound into the low molecular compound.

It follows that brown coal and lignite which have high oxygen contents and, for this reason, have not heretofore been valued much as the raw material for liquefaction can now be used effectively as the raw material by the adoption of the method of this invention.

The present invention will be described herein below with reference to preferred embodiments, which should not be construed as being limitative of this invention in any way.

EXAMPLE 1:

An autoclave having an inner volume of 100ml was charged with 5g of a test speciman (coal), 2g of water and 0.5g of potassium carbonate as a catalyst. The contents of the autoclave were compressed with carbon monoxide to the initial pressure of 80 kg/cm$^2$ and heated up to 450°C, with the rate of temperature increase fixed at 3°C/min. After completion of the reaction, the reaction mixture was cooled. The reaction product was tested for oxygen content by an oxygen analyzer, Model MO-10, made by Yanagimoto Manufactory. In the case of the raw material, the organic oxygen content thereof was accurately determined by having ashes removed therefrom in advance by means of a low-temperature calcination apparatus. The reaction mixture was separated into the organic compound produced by the reaction and the unaltered coal by a known technique such as solvent extraction, for example.

The test specimens used herein were prepared from the following coals.

| Raw material | Oxygen content(%) | Volatile matter(%) | Fixed carbon (%) | Analyses | | | |
|---|---|---|---|---|---|---|---|
| | | | | C | H | N | S |
| Taiheiyo coal | 16.2 | 45.9 | 37.9 | 76.3 | 6.2 | 1.5 | 0.2 |
| Sumiyoshi coal | 17.7 | 38.8 | 44.8 | 76.1 | 6.1 | 1.2 | 0.2 |
| Australia coal | 21.4 | 35.6 | 50.9 | 74.6 | 4.4 | 1.0 | 0.1 |
| Nissoteshio coal | 21.5 | 37.4 | 34.7 | 72.2 | 5.3 | 1.3 | 0.1 |
| Tokachi brown coal | 27.2 | 44.6 | 19.6 | 69.3 | 5.7 | 1.3 | 0.1 |
| Ishikari grass peat | 33.2 | 46.3 | 36.7 | 57.9 | 5.8 | 2.1 | 0.1 |
| Lignin | 25.5 | — | — | 69.2 | 5.3 | 0 | 0 |
| Cellulose | 48.8 | — | — | 44.6 | 6.4 | 0 | 0.1 |

The Results of the Tests

| | Raw material | Yield of low molecular organic compound (%) | Oxygen content of organic compound (%) | Rate of deoxidization (%) |
|---|---|---|---|---|
| 1 | Taiheiyo coal | 35.5 | 4.2 | 74.1 |
| 2 | Sumiyoshi coal | 37.8 | 3.8 | 78.5 |
| 3 | Australia coal | 25.2 | 4.9 | 77.1 |
| 4 | Nissoteshio coal | 36.3 | 4.2 | 80.5 |
| 5 | Tokachi brown coal | 27.2 | 3.8 | 86.0 |
| 6 | Ishikari grass peat | 33.2 | 3.8 | 88.5 |
| 7 | Lignin | 25.5 | 5.1 | 80.0 |
| 8 | Cellulose | 48.8 | 4.0 | 91.8 |
| 9 | Taiheiyo coal* | 37.8 | 4.4 | 72.8 |

*This material was obtained by deoxidizing Taiheiyo coal by the conventional hydrogenation decomposition process.

From the foregoing results, it is found that the ratio of deoxidization of the low molecular organic substance obtained in consequence of the reaction increases in proportion to the increasing oxygen content of the test specimen.

In the case of Taiheiyo coal which does not have a very high oxygen content, the test speciman in Test Run No. 9 was obtained by the conventional hydrogenation decomposition process. Thus, the data are useful for the purpose of comparison. Comparison shows that the method of the present invention excels said conventional process in terms of deoxidization efficiency.

In all the test runs described above, the test specimens were caused to undergo the reaction under identical conditions. At different reaction temperatures, these test specimens afforded good results in varying lengths of reaction time. In the case of Tokachi coal, for example, advantageous results were obtained when the reaction was carried out at 400°C for 1 hour.

What is claimed is:

1. A method for the treatment of an oxygen-containing compound selected from the group consisting of bituminous coal, sub-bituminous coal, brown coal, lignite, grass peat, wood, paper, lignin substances and petrolic asphalts, which comprises mixing said oxygen-containing compound with 10 to 100% by weight of water and 1 to 10% by weight of a red clay catalyst composition comprised, by weight, of 18 - 25% $Al_2O_3$, 15 - 20% $SiO_2$, 30 - 40% $Fe_2O_3$, 2 - 8% $TiO_2$ and approximately 8 - 12% ignition loss, based on the composition, the percentages of water and catalyst being respectively based on said compound, heating the resultant mixture at a temperature in the range of from 250 to 500°C and simultaneously compressing the mixture with carbon monoxide to 1 to 300 atmospheres for one to 100 minutes and thereby removing the oxygen from said compound and at the same time converting said compound into an organic substance of a lower molecular weight.

* * * * *